United States Patent [19]

Duvall

[11] 4,350,714

[45] Sep. 21, 1982

[54] CORN BRAN EXPANDED CEREAL

[75] Inventor: Leroy F. Duvall, Crystal Lake, Ill.

[73] Assignee: The Quaker Oats Company, Chicago, Ill.

[21] Appl. No.: 256,226

[22] Filed: Apr. 21, 1981

Related U.S. Application Data

[63] Continuation of Ser. No. 62,934, Aug. 2, 1979, abandoned.

[51] Int. Cl.³ .......................... A23L 1/10; A23L 1/18
[52] U.S. Cl. ................................. 426/559; 426/448; 426/449; 426/621
[58] Field of Search .................. 426/559, 618–622, 426/449, 96, 446, 448, 450, 463, 560, 625

[56] References Cited

U.S. PATENT DOCUMENTS 2,701,200  1/1955  Huber .............................. 426/446
3,458,321  7/1969  Reinhart ........................... 426/448
3,708,308  1/1973  Bedenk ............................ 426/448

Primary Examiner—Raymond N. Jones
Assistant Examiner—Elizabeth A. Hatcher
Attorney, Agent, or Firm—Joseph P. O'Halloran

[57] ABSTRACT

An extruded, expanded ready to eat cereal product containing substantial levels of corn bran is disclosed. Explosive expansion of the cereal dough with sudden release of pressure in the cooking extrusion step results in a high degree of cereal piece disintegration unless the corn bran ingredient which is used in the process is within critical particle size ranges. Product produced in accordance with the invention has preferred sensory qualities when compared with wheat bran. A high fiber expanded ready to eat product having improved textural and bowl life characteristics, compared to commercially available ready to eat cereals containing wheat bran, is disclosed.

10 Claims, No Drawings

CORN BRAN EXPANDED CEREAL

This is a continuation of application Ser. No. 062,934, filed Aug. 2, 1979, now abandoned.

BACKGROUND OF THE INVENTION

Recently, there has developed increasing interest among nutritionists and among consumers in high fiber food products, particularly in high fiber ready to eat cereals. At the present time, wheat bran is the principal ingredient which is relied upon to provide high fiber content for example in ready to eat cereals. However, some commercially available wheat-bran ready to eat cereal products become soggy and pasty almost immediately upon wetting of the product in milk. Others are very hard and go almost to the other extreme of not being palatable, even in milk, because of prolonged hardness.

On the other hand vast quantities of corn bran are available for use in the high fiber human food products such as, for example, ready to eat cereals. It would be highly desirable to produce high fiber cereal products utilizing corn bran as the source for the high fiber content, in conventional cooker-extruder expansion processes and equipment, such as those disclosed in U.S. Pat. No. 3,054,677 to W. R. Graham, Jr. et al. or U.S. Pat. No. 3,462,277 to R. R. Reinhardt. Such processes and equipment economically and at very high speeds, produce a modern, dry, ready to eat cereal product, having an attractive palatable appearance, e.g. a bite size or larger sized product, having strong sales appeal to the average consumer. The products are light, crisp and frangible, having pleasing color and taste.

In such processes a dry-appearing mixture of ingredients is passed quickly through a cooker-extruder in which high pressure and temperature is generated. The ingredients are quickly cooked, a dough is formed, and the dough is expelled through a constricted opening, e.g. through a plurality of dies, under high temperature and pressure conditions. Temperature and pressure ahead of the dies are maintained high enough to cause sudden release of pressure when the dough is forced through the dies, with sudden conversion of at least some of the moisture to steam in the extruded dough mass to develop small and large bubbles in the resulting product. This development of bubbles throughout the extrudate is called "expansion". The extruded expanded dough passes through a momentary, fleeting stage in which the dough is extremely cohesive, sticky and flexible, and upon the sudden flashing of some additional amounts of the water, the water content drops, and the pieces are immediately transformed into less sticky pieces. These pieces are then typically charged into a high temperature, high velocity air stream, in which the drying step is completed and the dry pieces develop the highly desirable toasted appearance.

However, the technology has not been available for the production of an extruded expanded cereal product using corn bran as an ingredient in such processes.

It is an object of the present invention to provide process technology for the production of extruded expanded ready to eat cereal products utilizing corn bran as the source of additional fiber. It is a further object of the present invention to provide an expanded ready to eat cereal product utilizing corn bran as an ingredient, which product has very favorable sensory characteristics. It is a further object of the present invention to provide a high fiber expanded ready to eat cereal product utilizing corn bran as the principal source of the additional fiber present.

SUMMARY OF THE INVENTION

In accordance with the present invention, and extruded expanded ready to eat cereal product utilizing corn bran as an ingredient to supply additional fiber, is produced in an otherwise conventional cooker-extrusion expansion process, but wherein the corn bran ingredient has been ground to a granulation of at least 100 percent through a 40 mesh U.S. sieve. In one preferred aspect corn bran ingredients having a granulation of 100 percent through a 60 mesh U.S. sieve and 70 percent through 100 mesh U.S. sieve are employed. Nonetheless, another preferred embodiment utilize a granulation such that 100 percent passes through 40 mesh, and 45 percent stays on a 60 mesh U.S. sieve. Although I have discovered that there is no limit with respect to the amount of extremely fine particles, in fact, for economic reasons I prefer to use ingredients in which substantial portion thereof, e.g. 40 percent remains on a 60 mesh sieve.

I have found that the improved process, in accordance with the present invention, is suitable for use with any type of cooked cereal dough ingredients, and in any process which utilizes a cooker-extruder, and which produces an expanded cereal product upon sudden release of pressure from the extruder through a die. There are many such processes widely known in the art, and for example those set forth in the above cited patents, and a wide range of densities are achieved in the resulting products due to the expansion into steam of the relatively low levels of water which are present in the dough in the extruder cooker.

Utilization of corn bran straight from the dry milling process in such processes was found to be totally unworkable. Such ingredients cause erratic plugging of the dies, surging of the dough through the extruder and orifices, and most significantly, results in extreme cereal piece disintegration during and after expansion. Furthermore, coarse grinding of the corn bran, e.g. so that a major portion of the bran just passes through 2 or 4 mesh U.S. sieve, although improving the orifice plugging problem, nonetheless results in unacceptable surging, as well as product disintegration during and immediately after expansion. We have found that when the corn bran is ground to fineness at or finer than the levels set forth above, the orifice extrusion problem is totally eliminated, the surging problem is totally eliminated, and the product disintegration problem during and after expansion is also eliminated. In addition, we have discovered that the resulting product has scored better than commercially available high fiber wheat-bran derived cereals when compared in consumer tests.

In the following examples all parts are expressed in parts by weight, and all temperatures are expressed in degrees fahrenheit.

EXAMPLE 1

The ingredients set forth below in Table 1 were added to a ribbon blender in the relative amounts set forth, and were mixed until the contents of the blender appeared to be homogenous.

TABLE 1

| | |
|---|---|
| Yellow Corn Flour | 49.9% |
| Corn Bran Flour* | 25.00% |

TABLE 1-continued

| | |
|---|---|
| Oat Flour | 15.00% |
| Sugar | 8.0% |
| Salt | 1.0% |
| Soda | 0.75% |
| Vitamin Premix | 0.15% |
| Ground Limestone | 0.17% |
| Color (brown) | 0.02% |
| | 100.0% |

*The corn bran flour is corn bran that has been ground to a granulation of 100 percent through 40 mesh U.S. sieve with 45 percent on 60 mesh U.S. sieve.

The resulting mixture was found to contain approximately 8 percent moisture. The resulting admixture is, in a separate blender, further admixed with additional quantity of makeup water so that the resulting admixture consists of approximately 20 percent total moisture. The resulting 20 percent moisture mix is free-flowing although it does give evidence of cohesion upon in-hand compression.

The 20 percent moisture mix is charged to an extruder cooker in which both the extruder and propulsion screw are equipped internally for water cooling. Room temperature water is circulated through both the jacket and the screw and approximately a 10° F. increase in temperature is encountered on the jacket although the screw coolant water exited at approximately 115° F. The extruder cooker is operated in a conventional manner to provide compression, propulsion, and extrusion of the dough, under conditions such that even though cooling is applied, the dough temperature upon extrusion is approximately 340° F. with the sudden release of pressure. For example, the extrudate is passed through six orifices closely arranged in a circle in the die base and the extrudate from each respective orifice contacts and coheres to extrudate on either side to form a tube. The tube is allowed to pass between conventional cutting rolls to result in individual pillow shape pieces. Typical conventional extrusion, and cutting equipment which is suitable for use in accordance with the present invention is shown in U.S. Pat. No. 3,054,677 to W. R. Graham, Jr. et al.

Upon the cutting of the product into pieces, in this example into pillows, the product is dropped into a high velocity high temperature air stream conveyor in which the air is at 600° F., for example, and conveyed to a cyclone separator and air lock and discharged into a third hopper. Thereafter the product is charged to a conventional enrober apparatus with a syrup at the ratio of 70 percent by weight of cereal pillows and 30 percent by weight syrup and admixed until a substantially uniform product is achieved wherein the resulting enrobed product is passed through a two phase oven to drop the moisture content to approximately 2–3 percent.

The coating syrup was prepared by admixing 40.8 parts of sugar (granular sucrose), 5.6 parts of coconut oil, 2.7 parts of salt, 0.1% vitamins, and 50.74 parts of water.

The product produced in accordance with Example 1 was tested for sensory quality against a number of commercially available wheat-bran based high fiber cereals. In this test, the product of Example 1 was compared in the homes of a number of consumers against wheat-bran base high fiber products which are commercially available, but which in this test were not identified to the consumer as to brand name. The product produced in accordance with Example 1 was found to have a clear preference over any of the products using wheat bran as the ingredient to provide the high fiber levels. The products of the present invention were reported to be preferred with respect to flavor, texture, and bowl life.

EXAMPLE 2

A series of comparative tests are performed in which the procedure of Example 1 is repeated, except that in a first test of this example corn bran straight from the corn dry milling process is used as the corn bran ingredient. In a second test coarse ground corn bran, i.e. 100 percent through 4 mesh U.S. sieve is utilized. In the first test severe orifice plugging is encountered, surging in the extrusion, is encountered and extreme product piece disintegration is observed. By product piece disintegration I mean that the particle pieces tend to become disintegrated during the expansion step, with the result that an extremely high percentage of broken cereal pieces are produced.

In the second test of this example, the die plugging problem is greatly relieved although not eliminated, severe surging continues to be observed, and again extreme cereal piece disintegration is observed.

The conditions set forth in the examples are not intended to be limiting, since the present invention is useful with any conventional cooker-extrusion expansion process for producing ready to eat cereal products. Nonetheless, preferred ranges for the operation of the cooker-extruder otherwise in accordance with Example 1 include the use of screw speeds, for example, from about 135–155 rpm, manifold pressures (i.e. at the dough just upstream from the die orifices) of 2400–2600 psi, dough temperatures at the die of 330°–350° F. and high velocity air stream temperatures of 600°–700° F. are preferred in the air conveyor.

Although the example utilizes cooked cereal dough ingredients selected from oats and corn as the main starch source, any other cereals and cooked cereal dough ingredients are useful in the process of the present invention. For example, wheat-derived ingredients such as wheat flour, can be used, and rice, sorghum, soya, tapioca, waxy maise, and other cooked cereal dough ingredients are also useful. Sugar ingredients, flavorants and the like, are also added conventionally.

In accordance with the present invention, a very desirable and satisfactory expanded ready to eat cereal product is produced utilizing the bran of corn. Also, the product produced therefrom was found to be of improved flavor and without wheat bran's heavy taste and texture. The product is believed to be a surprisingly desirable product inasmuch as the consumer tests which were conducted indicated that most people preferred the taste of corn over bran cereals made from wheat bran.

Thus, it is apparent from the above examples that, in accordance with the present invention, corn bran can be used successfully in the cooker-extruder production of expanded ready to eat cereal products providing it is first ground to the critical fineness range disclosed herein prior to incorporation of the corn bran as an ingredient in the manufacture of the extruded expanded cereal product. On the other hand, if corn bran straight from the dry milling process, or more crudely ground corn bran is employed a totally unsatisfactory and unworkable process results.

In accordance with the present invention, sufficient corn bran flour of the required fineness is added to the ready to eat cereal product ingredients to provide 1.5–10.0 percent fiber content derived from corn bran.

In preferred embodiments at the range of 3.5–7.0 percent fiber are provided. Products in the latter range are referred to in the trade as "high fiber" products.

I claim:

1. A process for producing a dry ready to eat high fiber cereal product comprising the steps:

admixing with cereal dough ingredients sufficient ground corn bran, as an ingredient to provide fiber content of 3.5 to 10 percent by weight, inclusive, based on the weight of the product, said corn bran having been ground to a fineness whereby 100 percent of said corn bran passes through a 40 mesh U.S. sieve, cooking the ingredients in a cooker-extruder to form an extrudate under temperature and pressure conditions sufficiently high to result in expansion of the dough upon its release from the cooker-extruder, cutting the expanded dough extrudate into discrete pieces, and drying the resulting pieces to a moisture level to 2–3 percent.

2. The process of claim 1 in which said ground corn bran has been ground to a fineness whereby 100 percent passes through a 40 mesh U.S. sieve, and at least 45 percent remains on a 60 mesh U.S. sieve.

3. The process of claim 1 in which the ground corn bran is added in an amount sufficient to provide between 1.5 and 10 percent fiber inclusive, based on the weight of the resulting product.

4. The process of claim 1 in which the ground corn bran is added in an amount sufficient to provide a fiber content of 3.5–7.0 percent by weight, inclusive, based on the weight of the product.

5. The process of claim 1 in which ground corn bran had been ground to a fineness of 100 percent through a 60 U.S. sieve and 70 percent through a 100 mesh U.S. sieve.

6. A process for producing a dry ready to eat high fiber cereal product comprising the steps:

admixing with cereal dough ingredients sufficient ground corn bran, as an ingredient, to provide at least 3.5 percent fiber in said product, said corn bran having been ground to a fineness whereby 100 percent of said corn bran passes through a 40 mesh U.S. sieve, cooking the ingredients in a cooker-extruder to form an extrudate under temperature and pressure conditions sufficiently high to result in expansion of the dough upon its release from the cooker-extruder, cutting the expanded dough extrudate into discrete pieces, and drying the resulting pieces to a moisture level of approximately 2–3 percent.

7. The process of claim 6 in which said ground corn bran has been ground to a fineness whereby 100 percent passes through a 40 mesh U.S. sieve, and at least 45 percent remains on a 60 mesh U.S. sieve.

8. The process of claim 6 in which the ground corn bran is added in an amount sufficient to provide between 3.5 and 10 percent fiber inclusive, based on the weight of the resulting product.

9. The process of claim 6 in which the ground corn bran is added in an amount sufficient to provide a fiber content of 3.5–7.0 percent by weight, inclusive, based on the weight of the product.

10. The process of claim 6 in which ground corn bran has been ground to a fineness of 100 percent through a 60 U.S. sieve and 70 percent through a 100 mesh U.S. sieve.

* * * * *